March 25, 1930.  S. D. TRUMBO  1,752,041
ANIMAL TRAP
Filed Dec. 13, 1926    3 Sheets-Sheet 1
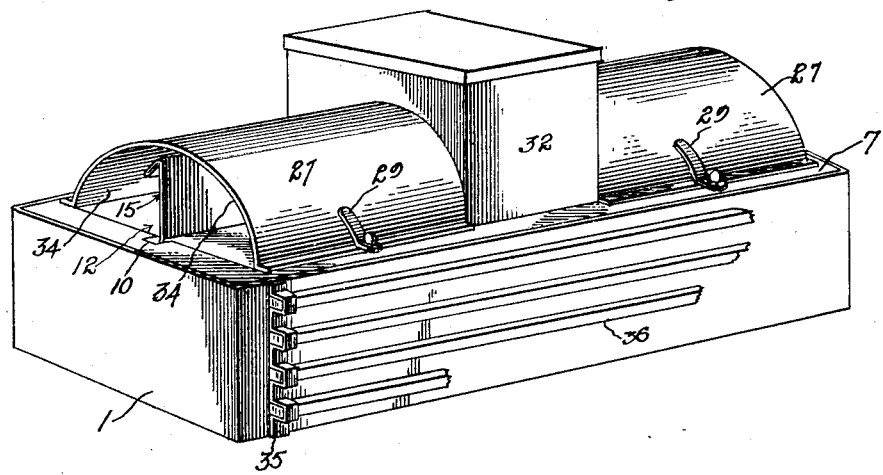
Fig.1.
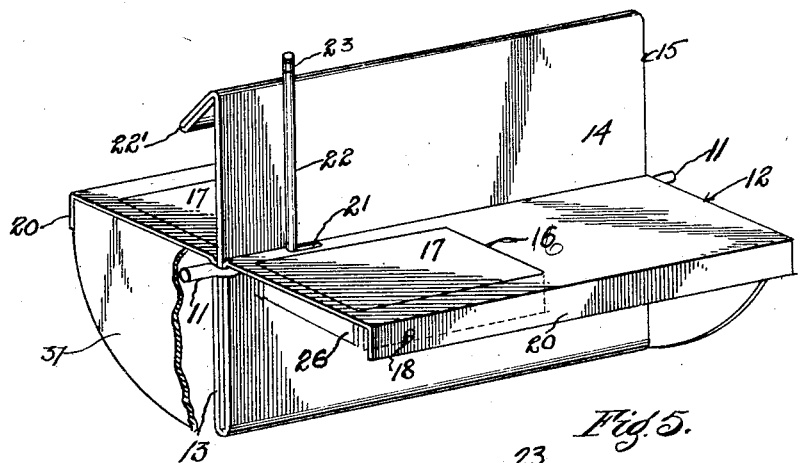
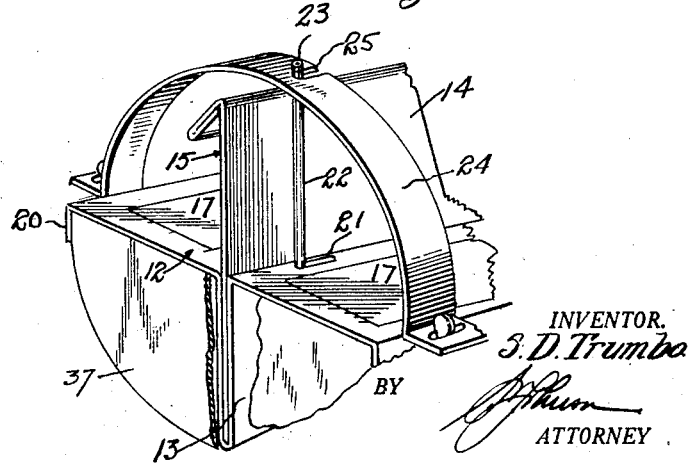
Fig.5.
Fig.6.
INVENTOR.
S. D. Trumbo
BY
ATTORNEY March 25, 1930.  S. D. TRUMBO  1,752,041
ANIMAL TRAP
Filed Dec. 13, 1926   3 Sheets-Sheet 2
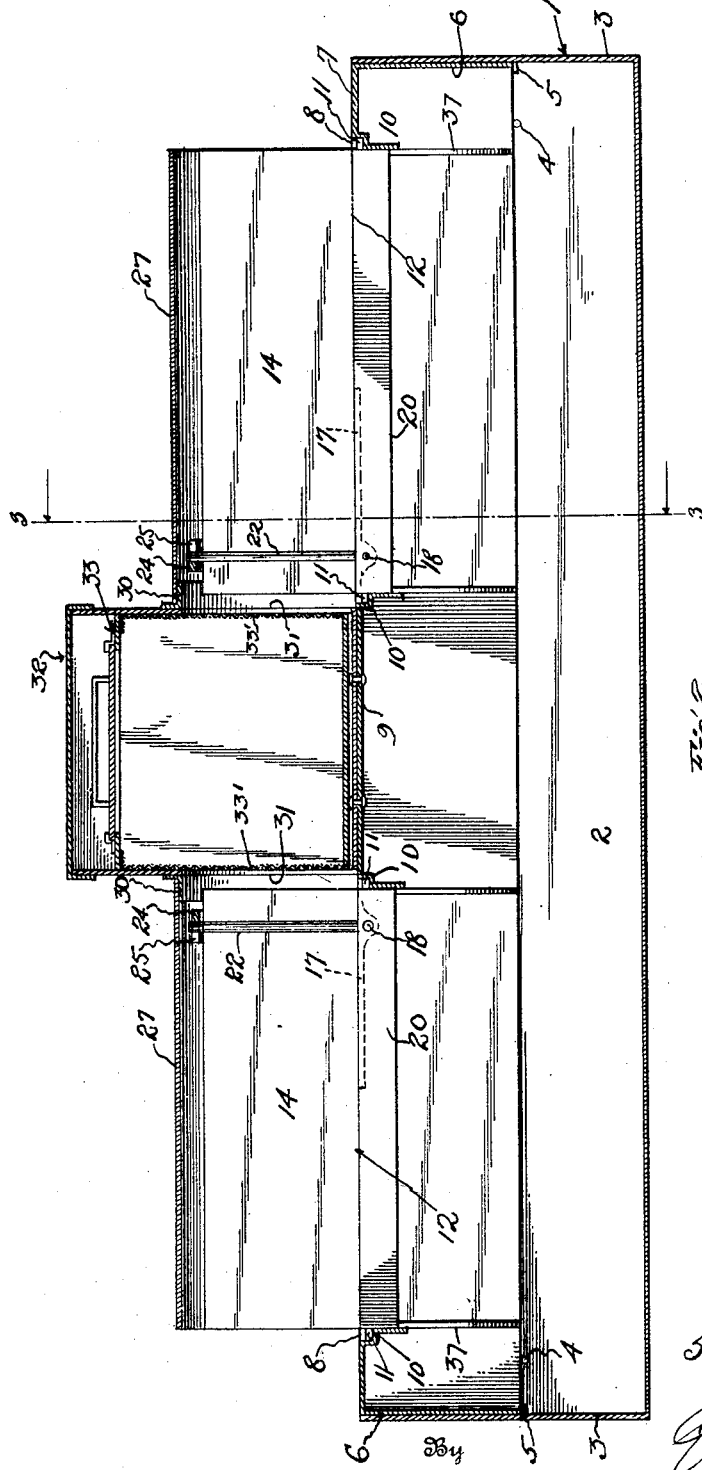
Inventor
S. D. Trumbo
By
Attorney March 25, 1930.  S. D. TRUMBO  1,752,041

ANIMAL TRAP

Filed Dec. 13, 1926    3 Sheets-Sheet 3

Inventor
S. D. Trumbo.
By
Attorney

Patented Mar. 25, 1930

1,752,041

UNITED STATES PATENT OFFICE

STACY D. TRUMBO, OF PITTSBURGH, PENNSYLVANIA

ANIMAL TRAP

Application filed December 13, 1926. Serial No. 154,482.

The present invention is directed to improvements in animal traps.

The primary object of the invention is to provide a device of this character so constructed that it will automatically trip to precipitate an animal into a receptacle, and will automatically reset itself.

Another object of the invention is to provide a device of this kind constructed and arranged in such manner that an animal may enter the trap from various points, and will in an attempt to reach the bait actuate a tripping plate, whereupon a platform will be released and tilt under the weight of the animal to precipitate the same into a receptacle.

Another object of the invention is to provide an animal trap wherein live bait may be used for enticing an animal into the trap, novel means being provided for assembling the bait container with the associated parts of the trap.

Another object of the invention is to provide a trap wherein no springs or complicated parts are necessary, and one which is extremely simple in construction, durable, efficient in operation, and which can be manufactured at small cost.

Another, and important object of the invention is to provide a tilting platform having associated therewith tripping plates so arranged and located that an animal can pass well into the trap before the tripping plates are encountered in order that the animal will not be startled or intimidated by moving parts until in a position where escape is impossible.

In the accompanying drawings:—

Figure 1 is a perspective view of the trap.

Figure 2 is a longitudinal sectional view.

Figure 5 is a perspective view of the platform.

Figure 6 is a fragmentary perspective view of the platform and locking bar.

Figure 3:
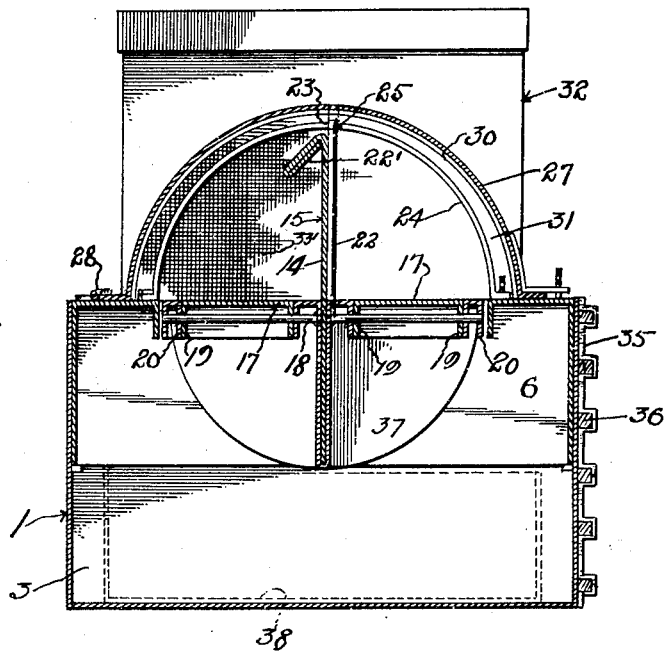
Figure 3 is a sectional view on line 3—3 of Figure 2.
Figure 4:
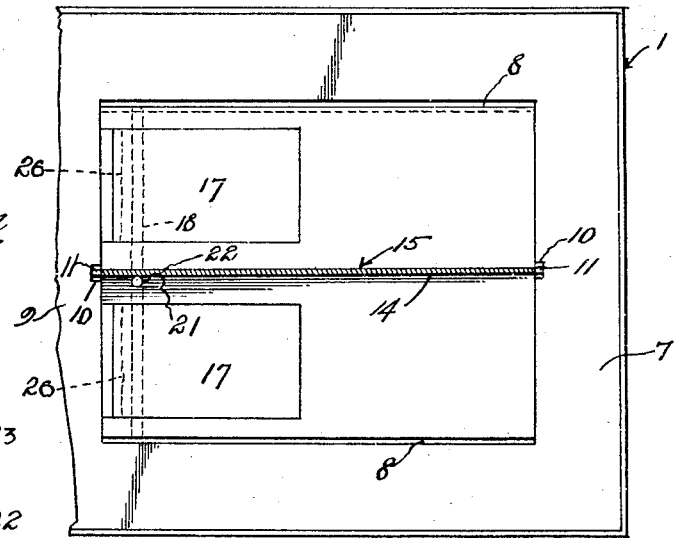
Figure 4 is a detail sectional view through the platform.
Figure 8:
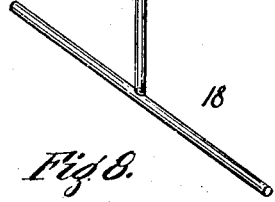
Figure 8 is a perspective view of the latch rod.
Figure 7:
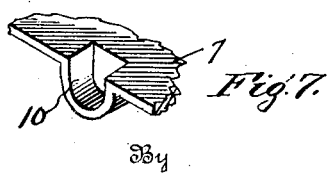
Figure 7 is a detail view of one of the bearings.

Referring to the drawings, 1 designates a receptacle formed from suitable sheet metal and preferably oblong in shape. The side and end walls 2 and 3 of the receptacle are provided, respectively, with studs 4 and 5 and with which the marginal depending flange 6 of the top frame 7 engage to limit the downward movement of the top frame.

This top frame is provided with a pair of alined rectangular openings 8 separated by a plate 9. Bearings 10 are located at the ends of the openings 8 for receiving the trunnions 11 suitably fixed to the respective ends of the tilting platforms 12.

Since the platforms are identical in construction and operation a detailed description of one will suffice for both. The platform is provided with a centrally located depending double walled shell 13 and in which is fitted and secured the lower half of the plate 14, the upper half being disposed at right angles to the platform and constitutes a division plate 15, the purpose of which will be later explained. Owing to the presence of the shell 13 a counter balance for the platform is obtained.

The platform is cut away at each side of its longitudinal axis, as at 16, to provide oppositely disposed openings to accommodate the tripping plates 17. The tripping plates are normally in a plane with the platform and are pivotally sustained in the openings in their operative positions by a shaft 18 common to both plates and is journaled intermediate its ends in the shell 13 adjacent the inner end thereof, said shaft being fixed to the respective depending side flanges 19 of the plates in order that when the plates are rocked similar movement will be imparted to the shaft. The ends of the shafts are also journaled in the depending side flanges 20 of the platform. Rising upwardly from the shaft and extending through a slot 21 formed in the platform is a latch rod 22 which lies adjacent one side of the plate 15, as shown in Figure 5 of the drawings, the upper end of said shaft having an anti-friction roller 23 thereon. Since this rod is located off center with respect to the longitudinal axes of the platform, the upper edge of the plate 15 is folded upon itself, as at 22' to serve as a counter balance for the platform and the shell 13 to retain it in a true horizontal position.

An arcuate latch bar 24 is removably secured to the top of frame 7 and straddles the platform, there being a notch 25 in the outer edge of said bar for engagement with the roller 23. The forward ends of the plates 17 have secured thereto weight bars 26 and since the same are located in advance of the shafts 18 the roller 23 will be retained in the notch 25 until the plates are tilted and the rod 22 swings outwardly, thus releasing the platform to permit the same to tilt under the weight of an animal.

A cover 27, semi-circular in cross section is provided for each platform and has one of its longitudinal edges hingedly connected to the top frame, as at 28, and its other similar edge detachably connected thereto by securing devices 29 in the nature of hasps. In this manner the covers can be conveniently swung open or closed and held firmly secured, and when open access can be had to the platforms.

The covers are slightly greater in length than the platforms in order that their inner ends will snugly engage the semi-circular flanges 30 defining the semi-circular openings 31 formed in the ends of the bait container 32. This container has its bottom suitably secured to the plate 9. It will be observed that the openings 31 are in registration with the respective covers 27 so that an animal entering from the outer end of either cover can see through both covers. When bait, such as cheese is used it may be placed upon the bottom of the container, or if desired a pan may be used and placed therein. If desired provision is made for using live bait, such as chicks and in order to do so a supplemental container is employed designated by the numeral 33, the end walls thereof being formed from wire mesh 33' to enable the animals to see the bait, and prevent the chick from escaping.

Owing to the fact that the plate 15 extends upwardly medially of the platform the interior of the cover will be divided into two independent passageways 34 which the animals traverse in an attempt to reach the bait in the container 32.

The supplemental bait container being removable can be easily cleaned and also can be used for transporting live bait. Shown upon the sides of the receptacle are supports 35 for supporting wooden bars 36 to enable animals to climb to the top of the frame 7 and enter the outer ends of the passageways 34. It will be of course understood that the ends of the receptacle may also be provided with such bars.

Semi-circular plates 37 are secured to the ends of the platforms to prevent animals from escaping from the trap as the platforms are tilted. As shown in Figure 3 of the drawings by dotted lines is a tank 38 in which water may be placed, the overflow water therefrom being caught in the receptacle 1 as it is displaced by trapped animals. Of course if desired this tank may be dispensed with an the water placed directly in the receptacle.

In using the trap suitable bait is placed in the container 32 and an animal after entering either of the passageways 34 will encounter the tripping plate and rocking the same. This rocking of the plate will cause the rod 22 to swing outwardly and will disengage the notch 25, whereupon the platform being released the weight of the animal will cause the platform to tilt thereby dumping the animal into the receptacle. After the animal leaves the platform it will return to its normal or re-set position. As the platform rights itself the roller 23 will ride upon the edge of the bar 24 in an obvious manner. The respective tripping plates 17 being located well within the passageways the animal will, in an attempt to reach the bait, pass fully within the passageway before being disturbed or startled by the movement of the tripping plate, thus being in such position at the time the plate is tripped as to prevent escape in a rearward direction. Since the platforms tilt in either direction the animals will be trapped in either passageway, and upon tilting thereof will be dumped into the receptacle and drowned.

What is claimed is:—

In a trap, the combination with a receptacle, a pair of tilting platforms over the receptacle, a pair of spaced opposed covers over the platforms, latch bars in the opposed ends of the covers and having notches therein, shafts journaled in the platforms, tripping plates associated with the platforms and fixed to the shafts, rods carried by the shafts and normally engaged in the notches to hold the platforms against tilting, the rods being releasable from the notches to permit tilting of the platforms upon actuation of the tripping plates.

In testimony whereof I affix my signature.

STACY D. TRUMBO.